US010581360B2

(12) United States Patent
Normann

(10) Patent No.: US 10,581,360 B2
(45) Date of Patent: *Mar. 3, 2020

(54) POWER SUPPLY ASSEMBLY AND ASSOCIATED METHOD

(71) Applicant: Aker Solutions AS, Lysaker (NO)

(72) Inventor: Truls Normann, Oslo (NO)

(73) Assignee: Aker Solutions AS, Lysaker (NO)

( * ) Notice: Subject to any disclaimer, the term of this patent is extended or adjusted under 35 U.S.C. 154(b) by 0 days.

This patent is subject to a terminal disclaimer.

(21) Appl. No.: 16/225,536

(22) Filed: Dec. 19, 2018

(65) Prior Publication Data

US 2019/0123674 A1    Apr. 25, 2019

Related U.S. Application Data

(63) Continuation of application No. 15/308,975, filed as application No. PCT/NO2015/050074 on May 7, 2015, now Pat. No. 10,199,975.

(30) Foreign Application Priority Data

May 7, 2014   (NO) .................................. 20140588

(51) Int. Cl.
*H02J 3/34*      (2006.01)
*H02K 5/132*    (2006.01)
(Continued)

(52) U.S. Cl.
CPC ................ *H02P 23/16* (2016.02); *H02J 3/00* (2013.01); *H02J 3/34* (2013.01); *H02J 9/061* (2013.01);
(Continued)

(58) Field of Classification Search
CPC ... E21B 33/035; H02J 3/34; H02J 9/04; H02J 9/06; H02J 9/061; H02J 9/062;
(Continued)

(56) References Cited

U.S. PATENT DOCUMENTS

2009/0200035 A1    8/2009  Bjerkreim et al.
2013/0002027 A1    1/2013  Yu et al.
(Continued)

FOREIGN PATENT DOCUMENTS

| EP | 1316672 A1 | 6/2003 |
|---|---|---|
| WO | WO-2005124095 A1 | 12/2005 |
| WO | WO-2007055587 A1 | 5/2007 |
| WO | WO-2007055593 A1 | 5/2007 |

(Continued)

OTHER PUBLICATIONS

Godell, Magrete, "International Search Report," prepared for PCT/NO2015/050074, dated Jul. 10, 2015, three pages.
(Continued)

*Primary Examiner* — Levi Gannon
(74) *Attorney, Agent, or Firm* — Winstead PC

(57) ABSTRACT

Subsea power supply assembly supplying electric power to a motor at a second location from a first location. The subseas power supply assembly includes a variable speed drive (VSD) and a step-up transformer connected to it. At a subsea location the assembly includes a first step-down transformer with input and output and an uninterruptible power supply having an input. A step-out cable supplies power from the step-up transformer to the motor. The cable connects to the first step-down transformer. The speed of the electric motor is proportional to the output frequency of the VSD. The power receiving input of the uninterruptible power supply connects to the output of the first stepdown transformer, thereby receiving electrical power with frequency equal to the output frequency of the VSD.

16 Claims, 13 Drawing Sheets

(51) Int. Cl.
    *H02P 23/16*     (2016.01)
    *H02P 27/04*     (2016.01)
    *H02J 9/06*      (2006.01)
    *H02J 3/00*      (2006.01)
    *H02P 5/74*      (2006.01)

(52) U.S. Cl.
    CPC .............. *H02J 9/062* (2013.01); *H02K 5/132* (2013.01); *H02P 27/047* (2013.01); *H02P 5/74* (2013.01)

(58) Field of Classification Search
    CPC . H02K 5/132; H02P 5/74; H02P 23/16; H02P 27/047
    See application file for complete search history.

(56) References Cited

U.S. PATENT DOCUMENTS

| | | |
|---|---|---|
| 2013/0286550 A1 | 10/2013 | Hazel et al. |
| 2014/0003963 A1 | 1/2014 | Wessel |

FOREIGN PATENT DOCUMENTS

| | | |
|---|---|---|
| WO | WO-2007055594 A1 | 5/2007 |
| WO | WO-2009135730 A1 | 11/2009 |
| WO | WO-2012164029 A2 | 12/2012 |

OTHER PUBLICATIONS

Baggerud, Erik, et al.; "Technical Status and Development Needs for Subsea Gas Compression"; Offshore Technology Conference, Houston, Texas; Apr. 30, 2007-May 3, 2007; 10 pages.

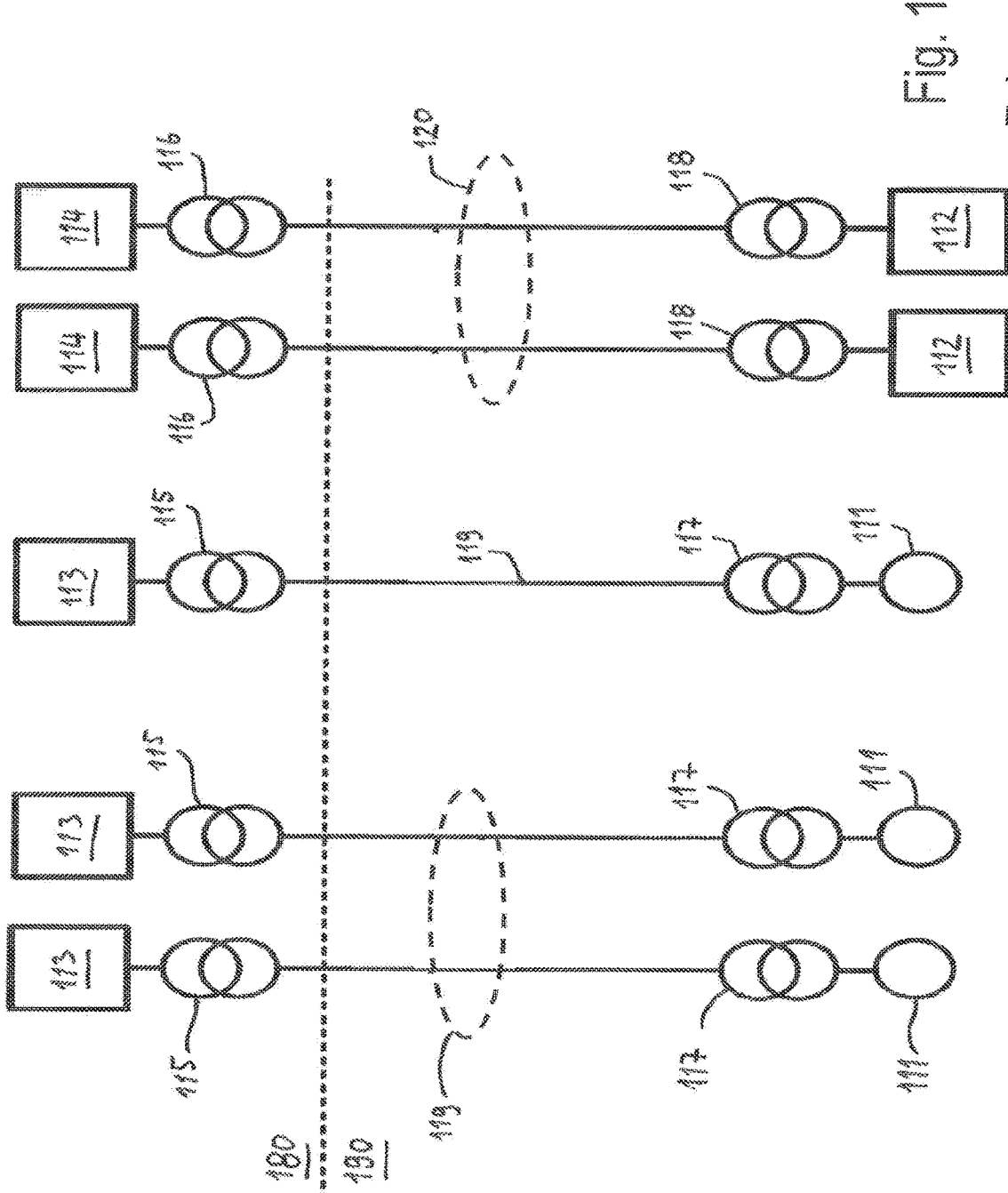

POWER SUPPLY ASSEMBLY AND ASSOCIATED METHOD

The present invention relates to a power supply assembly and an appurtenant method. In particular the assembly according to the invention is adapted to provide electric power to a large electric consumer as well as an associated subsea uninterruptable power supply (UPS).

BACKGROUND

For large electric subsea consumers, typically electrical motors for hydrocarbon compression or hydrocarbon pumps, it is known to have a subsea electric control system to monitor their function and various associated parameters. Additionally, other subsea low voltage/low power auxiliary systems may be present.

For some known systems, such as systems with topside VSDs (variable speed drives) and long cables with high voltage transmission via subsea cables to subsea compressors/pumps, such control power supply is provided with a topside UPS (uninterruptable power supply) that connects to the subsea control system. However, with long step-outs, typically above 50-60 km, the Ferranti effect in the control power supply cable results in stability challenges for the subsea CPDU (control power distribution unit) and the topside UPS due to reactive power flow from capacitance in the long cable. Thus, for long step-outs it is appropriate to use a subsea UPS unit instead of a topside UPS, and to ensure that the subsea UPS input voltage and frequency is within an acceptable range. For instance, one may use one or two subsea UPS units per compressor train (each train typically includes one compressor and one pump). There are also cases where there may be only compressors or only pumps on the seabed, where the same type of control system power supply applies.

FIG. 1 illustrates a setup according to the prior art, where two UPS's arranged subsea are provided with power through a dedicated umbilical. This will be described in detail further below.

Normally at least two UPS units are used subsea for redundant control supply, which is a necessity for safe operation of the control system in case control power is lost or the subsea boosting system is tripped. In such a case of loss of power, it is crucial to have UPS units that can provide enough power for safe shutdown and sleep mode of the subsea control system. To supply the subsea UPS units on the seabed with power, the obvious solution is to arrange a dedicated power supply line to the subsea UPS, either in a separate umbilical or as an integrated part of the power umbilical/cables supplying the subsea motors for the compressors and/or pumps. However, for long step-outs, that would dramatically increase cost due to more cables and elements in the umbilical(s). The most relevant solution when combining control power and motor power in the same power umbilical would be to arrange 3 more conductors in the umbilical that delivers power to the motor. Typically, one would use one umbilical per compressor train. There is however a problem in that the number of supply systems (multiples of 3 cables (conductors/phases) per 3-phase power supply system) per umbilical is limited due to risk of cross-talk and the number of layers in the umbilical before it gets too large in diameter or cost gets too high.

For the cases with compressor train power supply, the umbilical normally has the compressor motor power supply in the center, and pump motor supply cables are twisted in the layer about the center portion (cf. FIG. 2a). Twisting is used to electromagnetically de-couple the 3-phase systems/layers. This eliminates induced voltages and potential torque pulsations. This is in order to make sure that there is no crosstalk from the compressor power supply conductors to the pump power supply conductors (the same logic applies if there are only pumps or only compressor on the seabed). However, having three more conductors for the subsea UPS power supply in the same umbilical would involve technical challenges or disadvantages. Such conductors could be arranged in a third outer layer (cf. FIG. 2c), however that would result in an excessive outer diameter of the umbilical. Alternatively, they could be arranged in the second and thus the same layer as the pump power supply conductors (cf. FIG. 2b). However, when conductors are in the same layer, there will be crosstalk. There is then a risk that the pump power supply (in general the 3-phase system in the same umbilical layer as the control power supply) will give unwanted crosstalk into the control system power supply, and vice versa, for instance during a short-circuit.

Hence, an objective of the present invention is to find a solution of supplying electric power to remotely arranged subsea UPS units that avoids such problems.

Publications WO2007055593 and WO2007055594 describe a subsea power supply assembly in which electric power of constant frequency is delivered from a topside main power source to a subsea location. At the subsea location, power is distributed to auxiliary power consumers (e.g. control power) and subsea variable speed drives which delivers power to electric motors. In such a setup, a vast amount of equipment needs to be installed at the subsea location.

A similar setup is described in WO2007055587, where a UPS system for subsea use is discussed. Also in this setup, variable speed drives are installed subsea for delivering power of variable frequency to the large electric consumers, namely the electric motors for pumps and compressors.

European patent application EP1316672 describes a power supply system where power is transmitted from topside to the subsea location with a high voltage DC cable.

THE INVENTION

According to a first aspect of the present invention there is provided a subsea power supply assembly supplying electric power to an electric motor at a second location from a first location. At the first location, the assembly comprises a variable speed drive having a variable speed drive output and a step-up transformer connected to the variable speed drive output. At the second location, which is a subsea location, the assembly comprises a first step-down transformer having an input and an output, as well as an uninterruptable power supply having a power receiving input. The assembly also comprises a step-out cable that is adapted to supply electric power from the step-up transformer to the electric motor. The step-out cable is connected to the first step-down transformer. The speed of the electric motor is proportional to the output frequency of the variable speed drive. According to the invention, the power receiving input of the uninterruptable power supply connects to the output of the first step-down transformer, thereby receiving electrical power with frequency equal to the output frequency of the variable speed drive.

Normally, also the output frequency can be proportional with the VSD output voltage and subsea motor voltage. Or in other words, the VSD output voltage and subsea motor voltage can be proportional to the output frequency.

Thus, the uninterruptable power supply receives the same variable frequency as does the electrical motor. This normally implies receiving variable frequency from start-up of the motor, from standstill, to nominal/maximum operational speed (corresponding to the rated frequency of the electrical motor). This means that the variable frequency, which according to the invention is received by the UPS unit, varies in an area between the rated speed/frequency of the electrical motor (maximum frequency—100%) and down to at least 50% of the rated speed. Advantageously the variable frequency will vary between the rated frequency and down to 5% or even down to 2.5% of the rated frequency. Upward, the UPS unit may advantageously be adapted to receive up to 105% or even 110% of the rated speed/frequency of the electrical motor. In other words, advantageously the UPS unit is adapted to receive electrical power with a frequency range between 2.5-5% to 105-110% of the nominal speed/rated speed/frequency.

So the UPS will see this typical input frequency range, and not the conventional UPS application of typically 50 z or 60 Hz+/−5%, and typically 400V, 440V or 690V+/−110% or +/−15%. The conventional mode for industrial UPS units and prior art is that the input frequency and voltage is assumed constant within a certain narrow band, and not a wide frequency, speed and associated operational voltage range that is typical for start-up and operation of large electrical consumers such as a subsea pump, ESP (electrical submersible pump) and compressor motors.

In some embodiments, the electric motor may constitute an electric load in the region of 100 kW or above. It may even constitute an electric load of 5 MW or more. For instance, when the power supply assembly according to the invention is used for a subsea compression facility, even larger electric motors may constitute the electric load.

In an embodiment of the invention, the subsea power supply assembly is used in association with a subsea hydrocarbon compression facility, including electric motors installed to drive a subsea hydrocarbon pump and a subsea hydrocarbon compressor.

In an embodiment of the first aspect of the invention, the motor is connected to the output of the first step-down transformer.

An auxiliary step-down transformer can be connected between the output of the first step-down transformer and the uninterruptable power supply.

In an alternative embodiment, an output of the first step-down transformer that connects to the uninterruptable power supply, is constituted by an auxiliary winding of the first step-down transformer.

The uninterruptable power supply and the electric motor are functionally connected to the same at least two conductors in the step-out cable. Normally the step-out cable will have at least one three-phase supply, comprising three conductors. However, one can also imagine a solution having a two-phase solution including only two conductors. With the term "functionally connected", is meant that the UPS and the electric motor receives power from the same conductors in the step-out cable, but are not necessarily connected directly to those conductors. For instance, they can be connected via a step-down transformer that provides galvanic isolation between the conductors and the load side.

The step-out cable can typically be an umbilical comprising a first set of three electric conductors in a first layer, which is an inner layer, and a second set of three electric conductors in a second layer, which is outside the first layer. One of the first and second sets then provides power to said electric motor and the other set provides power to an additional electric motor.

In a typical embodiment of the invention, the first location can be a topside or onshore location, the motor can constitute an electric load of above 100 kW, and the variable speed drive at the first location can be arranged more than 5 km apart from the motor.

According to a second aspect of the present invention, there is provided a method of starting and running an electric motor that is mechanically connected to drive a pump or compressor at a second location, which is a subsea location. A first end, a step-out cable receives electric power from a variable speed drive at a first location, via a step-up transformer. The electric motor is connected to an opposite second end of the step-out cable. An uninterruptable power supply which has a battery, and a first step-down transformer are arranged at the second location. The uninterruptable power supply is adapted to be connected to an output of the first step-down transformer via an uninterruptable power supply switch. According to the second aspect of the invention, the method comprises the following steps:

a) providing electric power from the output of the variable speed drive to the uninterruptable power supply by closing the uninterruptable power supply switch, and thereby charging the battery;

c) after step a), providing electric power from the same variable speed drive to the electric motor by closing a motor switch, and simultaneously providing electric power to the uninterruptable power supply from the variable speed drive.

The uninterruptable power supply unit used in the method of the second aspect of the invention will also be adapted to receive the variable frequency range, as discussed above with regards to the first aspect of the invention.

In an embodiment of the second aspect of the invention, between step a) and step c), the method comprises the following step:

b) reducing the output of the variable speed drive.

In this embodiment, step c) further comprises increasing the output of the variable speed drive, as the motor switch has been closed.

Reducing the output of the variable speed drive (VSD) may include lowering its output to zero or substantially zero (i.e. no voltage or current at its output). In other embodiments, reducing the output may include reducing the output to an output which is significantly above zero, and suitable as a start-up frequency and start-up voltage. In such a case, one can use a circuit breaker as the motor switch, which is able to connect a load to a voltage/energized supply. After closing the motor switch, the voltage and frequency of the VSD are ramped up to accelerate the electric motor.

Step a) of the method according to the second aspect of the invention can further comprise reducing the voltage delivered from the first step-down transformer to the uninterruptable power supply by means of an uninterruptable power supply step-down transformer that is arranged between the first step-down transformer and the uninterruptable power supply.

In another embodiment, step a) further comprises reducing the voltage delivered from the first step-down transformer to the uninterruptable power supply by means of delivering electric power through an auxiliary winding of the first step-down transformer.

In embodiments of the method of the second aspect of the invention that includes step b), step b) can further comprise opening the uninterruptable power supply switch;
and step
c) can further comprise closing the uninterruptable power supply switch when the electric motor has reached a predetermined speed.

With this embodiment of the method according to the second aspect of the invention, one avoids feeding the UPS with too low frequencies. That is, electric power to the UPS can be connected when the electric motor and VSD, respectively, has reached a frequency (and preferably voltage) which is sufficiently high to be suited for feeding the UPS.

According to a third aspect of the present invention, provided is a method of running and controlling the speed of an electric motor arranged in a second location and providing electric power to an uninterruptable power supply (UPS) arranged in the second location. The second location is a subsea location. A variable speed drive is arranged at a first location and is functionally connected to the electric motor. The speed of the electric motor is controlled by controlling the output frequency of the variable speed drive. A step-out cable transmits power from the variable speed drive to the electric motor, and thus extends between the first location and the second location. According to the third aspect of the invention, the method comprises transmitting electric power to the uninterruptable power supply through at least two conductors in the step-out cable which are the same conductors that transmit power to the electric motor.

Thus, the power supply for the motor is used for supplying the UPS. That is, the UPS receives power from the same conductors that delivers power to the motor. As with the first and second aspects of the invention, the UPS is adapted to receive electric power having the said variable frequency range from the VSD, which was discussed above.

DETAILED EXAMPLES OF EMBODIMENT

While the general aspects of the present invention has been described above, some more detailed and non-limiting examples of embodiment are given below with reference to the drawings, in which FIG. 1 is a schematic illustration of a prior art solution or an obvious solution for long step-outs which involve the adverse effects discussed above;

Figure 2C:
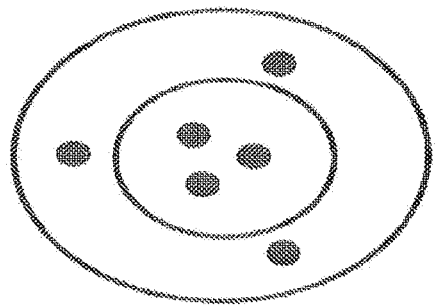
FIG. 2c is a cross section principle view of an umbilical similar to the one in FIG. 2a, where a third layer with a third set of conductors has been added.

FIG. 1 illustrates a power supply assembly according to the prior art. In this assembly, variable speed drives (VSD) 113 are arranged at a topside location 180 and each connects to a dedicated step-up transformer 115. The topside location 180 can typically be on a surface installation. The step-up transformers 115 each connect to a dedicated step-out cable, here in the form of an umbilical 119 of a common type. The umbilical 119 extends from the topside location 180 to a remote subsea location 190. Hence, the umbilical 119 can be several tens of kilometers. The horizontal dashed line illustrates the partition between topside/onshore location and the subsea location. At the subsea location, the umbilicals 119 connect to step-down transformers 117. The step-down transformers 117 connect to the motors 111, which are mechanically connected to mechanical loads (not shown), such as a compressor or a pump.

On the left hand side of FIG. 1 two motors 111 receives power from a common umbilical 119, as indicated with the dashed circle. This umbilical 119 has two sets of conductors, each set including three conductors (3-phase power supply). A cross section of such an umbilical is shown in FIG. 2a.

In the mid portion of FIG. 1 an umbilical 119 having only one set of conductors, i.e. one 3-phase, supplies power to one motor 111, via a step-down transformer 117.

In order to provide control power supply, two control power sources 114 are arranged at the topside location 180 The control power sources 114 each connects to a dedicated control power step-up transformer 116, which are also arranged topside. A common control power umbilical 120 extends between the control power step-up transformers 116 and control power step-down transformers 118 arranged at the subsea location. Control power loads 112 are connected to the control power step-down transformers 118.

An important feature of this assembly according to the prior art, is that in the umbilicals 119 which provide power to the large consumers, i.e. the motors 111, the delivered power has a varying frequency. The frequency is the same as the output frequency of the VSD's 113, which varies according to the speed of the motor 111. In contrast, the power in the control power umbilicals 120 has a fixed frequency. This frequency is typically 50 or 60 Hz. Hence, the control power load 112 is adapted to receive this fixed and predetermined frequency.

In an alternative embodiment of the prior art assembly, the control power sources 114 could be replaced with UPS's (uninterruptible power supply). In another prior art assembly, the control power load(s) 112 can be a control power distribution unit (CPDU).

As will be appreciated by the person skilled in the art, an unnecessary number of step-out cables (umbilicals) can dramatically affect cost. This fact applies in particular for long step-outs, where the distance between the first location, as the topside location 180, and a second location, as the subsea location 190 in FIG. 1 is large.

Figure 2B:
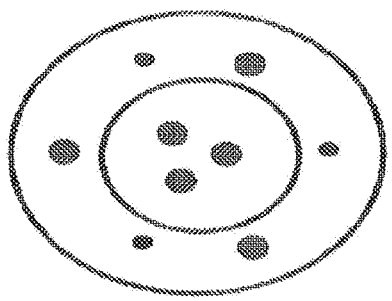
FIG. 2b is a cross section principle view of an umbilical similar to the one in FIG. 2a, wherein an additional set of conductors has been added in the second layer.
Figure 2A:
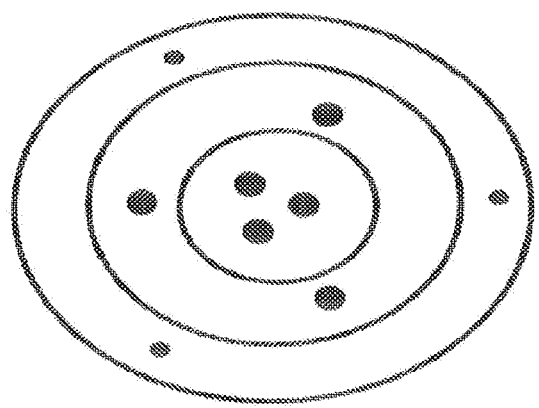
FIG. 2a is a cross section principle view of an umbilical having a first set of conductors supplying power to a first motor and a second set of conductors in a second layer providing power to a second motor.

FIGS. 2*a*, 2*b* and 2*c* show cross section views of three alternative umbilicals. The cross section of FIG. 2*a* illustrates a typical umbilical having a first set of three electric conductors in an inner or first layer. These conductors typically deliver 3-phase electric power to a subsea compressor motor. In a second layer, a second set of three electric conductors is arranged, which for instance provides electric power to a subsea pump motor. Hence, both a compressor motor and a pump motor are provided with electric power through the same umbilical. In order to avoid cross-talk between the two sets of conductors, they are arranged in different layers within the umbilical, and are twisted with different pitch. These two motors can be connected to two identical or differently sized/designed pumps or two identical or differently sized/designed compressors. The subsea compressor/pump motors may be operated at different frequency/voltage/current from the topside VSDs that deliver the electric power to the umbilical.

An alternative embodiment of the umbilical shown in FIG. 2*a*, is to use one set of conductors, e.g. the inner 3-phase set, for power supply to a motor, and using the other set for power supply to a subsea control power supply, such as a subsea uninterruptable power supply. In such a solution one may convey power to a large electric consumer (motor) as well as control power with the same umbilical (step-out cable).

As discussed above, arranging a third set of conductors in the second layer, together with the second set, will result in cross-talk and is particularly disadvantageous for large distances. An example of such a disadvantageous solution is shown with the umbilical cross section of FIG. 2*b*.

An alternative to the example shown in FIG. 2*b* is shown in FIG. 2*c*. In such an embodiment, the third set of conductors is arranged in a third layer (with different twisting pitch than the other two layers). This dramatically increases the outer diameter of the umbilical. Although reducing problems relating to cross-talk between the sets of conductors, the cost, weight and required space for handling such an umbilical is severely increased. This of course applies particularly to long umbilicals. As will appear from the discussion below, the present invention provides a way to avoid using an umbilical of the type shown in FIG. 2*b* or FIG. 2*c*, even when delivering power to a remotely and subsea located uninterruptable power supply. Moreover, if only one subsea motor is used, in an embodiment according to the invention it is possible to use only one set of 3-phase cables (either triads or 3 single core cables) without needing an extra set of conductors (or layers in the umbilical) for control power. It should be noted, as will be appreciated by the person skilled in the art, that for some embodiments a set of two conductors can be used in lieu of three conductors, i.e. using two-phase instead of three-phase.

Figure 3:
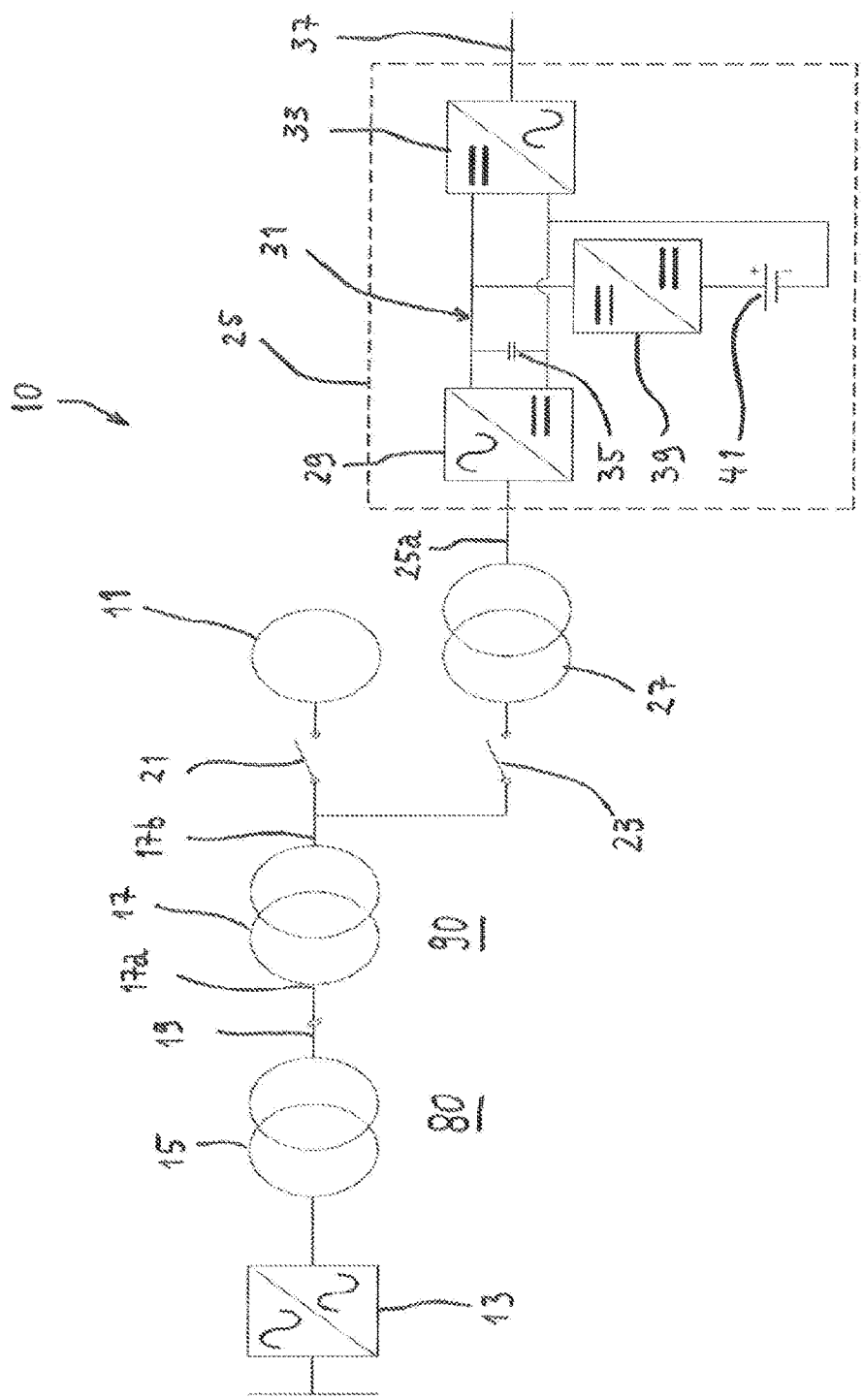
FIG. 3 is a schematic illustration of a subsea power supply assembly according to the present invention.

FIG. 3 illustrates a typical embodiment of a power supply assembly 10 according to the invention. On a remote location 90, which is a subsea location, there is arranged a large electric consumer in the form of an electric subsea pump motor 11. The electric subsea pump motor 11 is adapted to drive a subsea pump (not shown) installed in association with a hydrocarbon pipeline (not shown).

The electric motor 11 is provided with power from a first location 80, which is a topside location, for instance on an onshore location or an offshore surface installation. At the topside location 80 there is arranged a topside VSD 13 (variable speed drive). A step-up transformer 15 is connected to the output of the VSD 13, also at the topside location 80.

The first location could in other embodiments be a subsea location, as the second location is.

At the remote subsea location 90 there is arranged a first step-down transformer 17, the input 17*a* of which receives electric power from the step-up transformer 15 through a long step-out cable in the form of an umbilical 19. The umbilical 19 can be several tens of kilometers, for instance more than 40 kilometers or even more than 100 kilometers. Thus, the umbilical 19 is a part of the subsea power supply assembly 10 that spans between the topside location 80 to the remote subsea location 90. It is noted however, that the step-out cable 19 may be significantly shorter in other embodiments according to the present invention.

Moreover, it is noted that in other, similar embodiments, the first step-down transformer 17 could be omitted. Such an embodiment would be most relevant in a case where the step-out distance is not too long, however so long that a reduction of the number of step-out cables between the first location 80 (e.g. topside location) and the second location 90 (e.g. subsea location) is advantageous.

The electric motor 11 connects to an output 17*b* of the first step-down transformer 17 through a motor switch 21. In this embodiment the motor switch 21 is in the form of a circuit breaker which can connect and disconnect, as well as protect against short-circuits, when voltage is applied to it, as well as protect against short-circuits. Thus, when the motor switch 21 is closed, the subsea pump motor 11 can be supplied with electrical power via the umbilical 19. In other embodiments the motor switch 21 may be a disconnector, which is not able to disconnect or connect when voltage is applied. It may also be a load disconnector, which can disconnect and connect, when voltage is applied, but not protect against short-circuits. The skilled person will choose the type of motor switch 21 which is most appropriate. On one hand, he may want to have a simple and cheap switch. On the other hand a more advanced switch will be more versatile.

A UPS switch 23 is connected to the output 17*b* of the first step-down transformer 17 at the same position as the motor switch 21 is. The UPS switch 23 connects an input 25*a* of a subsea UPS 25 to the output 17*b* of the first step-down transformer 17 via an auxiliary step-down transformer 27. In this embodiment, the auxiliary step-down transformer 27 may be called a UPS step-down transformer. Thus the subsea UPS 25 can be supplied with electric power from the same source (the first step-down transformer 17) as from which the subsea pump motor 11 is fed. Due to the auxiliary step-down transformer 27, this electric power to the subsea UPS 25 will have a lower voltage than what is fed to the subsea pump motor 11, but will have the same frequency (which may be a variable frequency). As with the motor switch 21, the appropriate type of UPS switch 23 can be chosen by the skilled person.

Due to the motor switch 21 and the UPS switch 23, the operator is able to choose between feeding electric power only the subsea pump motor 11, only to the subsea UPS 25, or to both simultaneously, or neither.

In the following the subsea UPS 25 will be described. The subsea UPS 25 is schematically depicted with the rectangle having broken line. At an input side of the subsea UPS 25 there is arranged a UPS rectifier 29. A DC-link 31 connects the UPS rectifier 29 to a UPS inverter 33 on the output side of the subsea UPS 25. A UPS output 37 is on the opposite side of the UPS inverter 33. The UPS output 37 typically connects to monitoring equipment such as temperature and pressure sensors, and control equipment such as electrically actuated valves, magnetic bearing control modules, local flowline/spool heating, etc.

The DC-link 31 comprises a capacitor arrangement 35 that smoothens out the rectified voltage from the UPS rectifier 29.

Also connected to the DC-link 31, in this embodiment, are a buck-boost converter 39 and a battery 41. When the UPS switch 23 is connected, the battery 41 can be charged. When the UPS switch 23 is disconnected, the battery 41 can supply electric power to the UPS output 37.

In the embodiment depicted in FIG. 3, the umbilical 19 could typically be of the type shown in the cross section of FIG. 2a, however without the outer layer (outer set of conductors). That is, the umbilical could have only one set of three conductors for providing power both to the motor 11 and to the subsea UPS 25.

Figure 4:
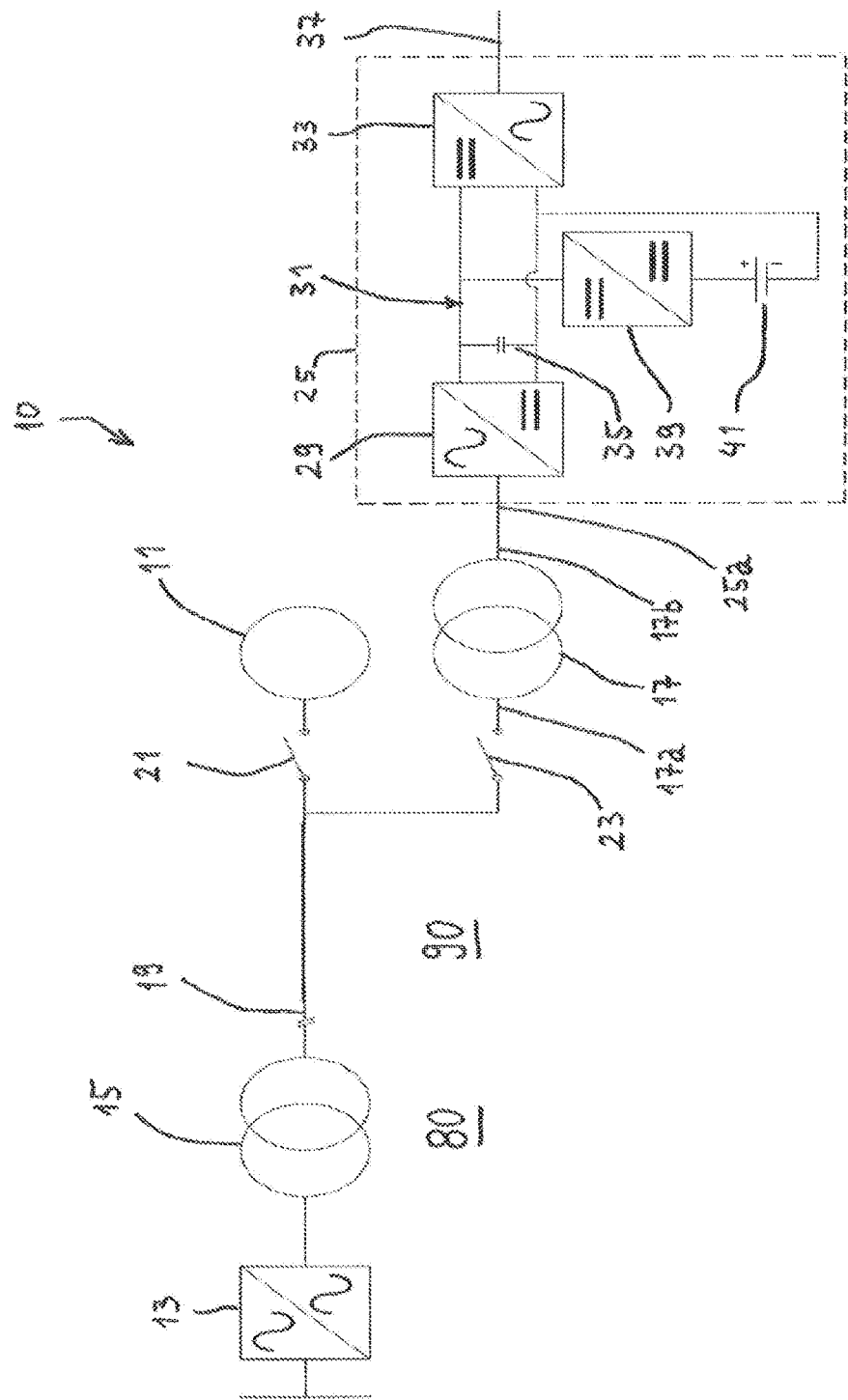
FIG. 4 is a schematic illustration depicting an alternative embodiment of the invention.

FIG. 4 illustrates an embodiment somewhat different from the embodiment shown in FIG. 3. The embodiment of FIG. 4 does not include the auxiliary step-down transformer 27, which in the embodiment of FIG. 3 was arranged between the subsea UPS 25 and the first step-down transformer 17. Moreover, there is no step-down transformer between the umbilical 19 and the motor 11. Thus, the voltage provided to the motor 11 corresponds to the voltage in the umbilical 19.

Figure 5:
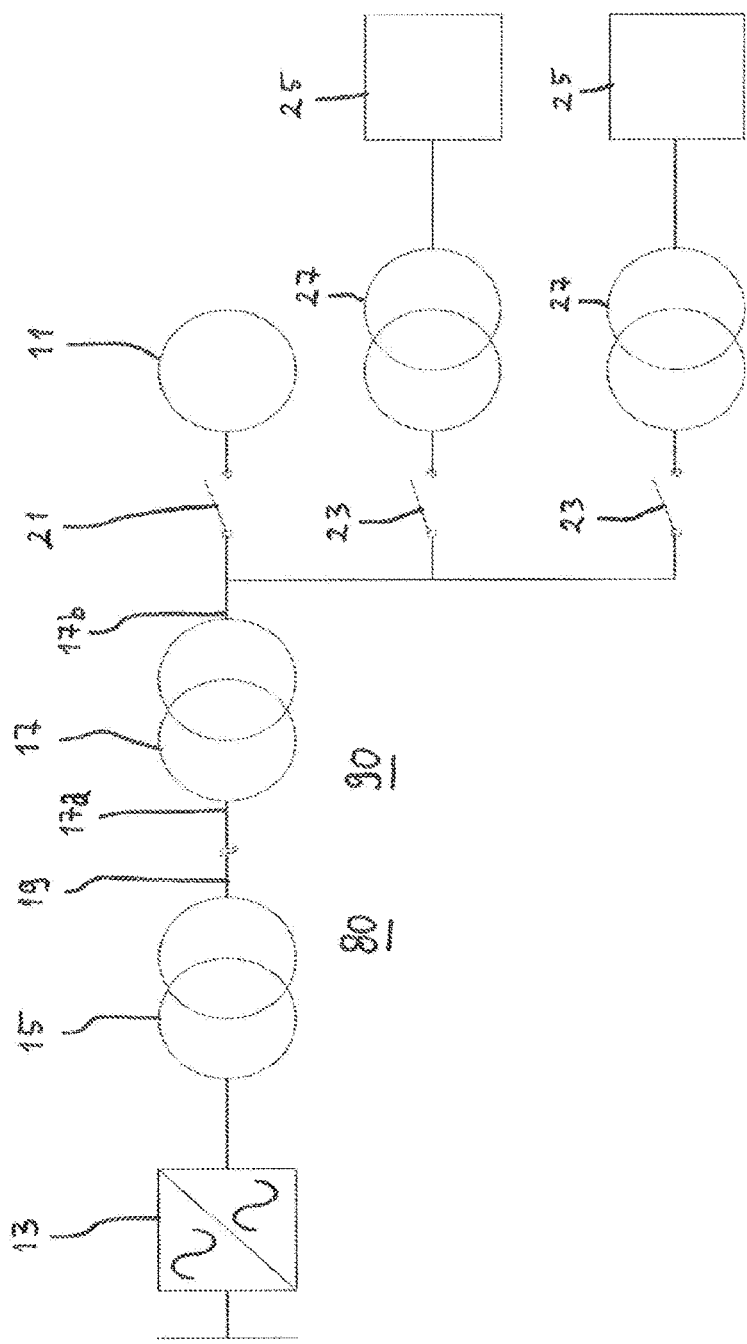
FIG. 5 is a schematic illustration of another embodiment of the present invention.

FIG. 5 illustrates an embodiment similar to the embodiment described with reference to FIG. 3. However, in this embodiment, two UPS's 25 are connected to the first step-down transformer 17 for redundancy, through respective UPS step-down transformers 27 and UPS switches 23.

Figure 6:
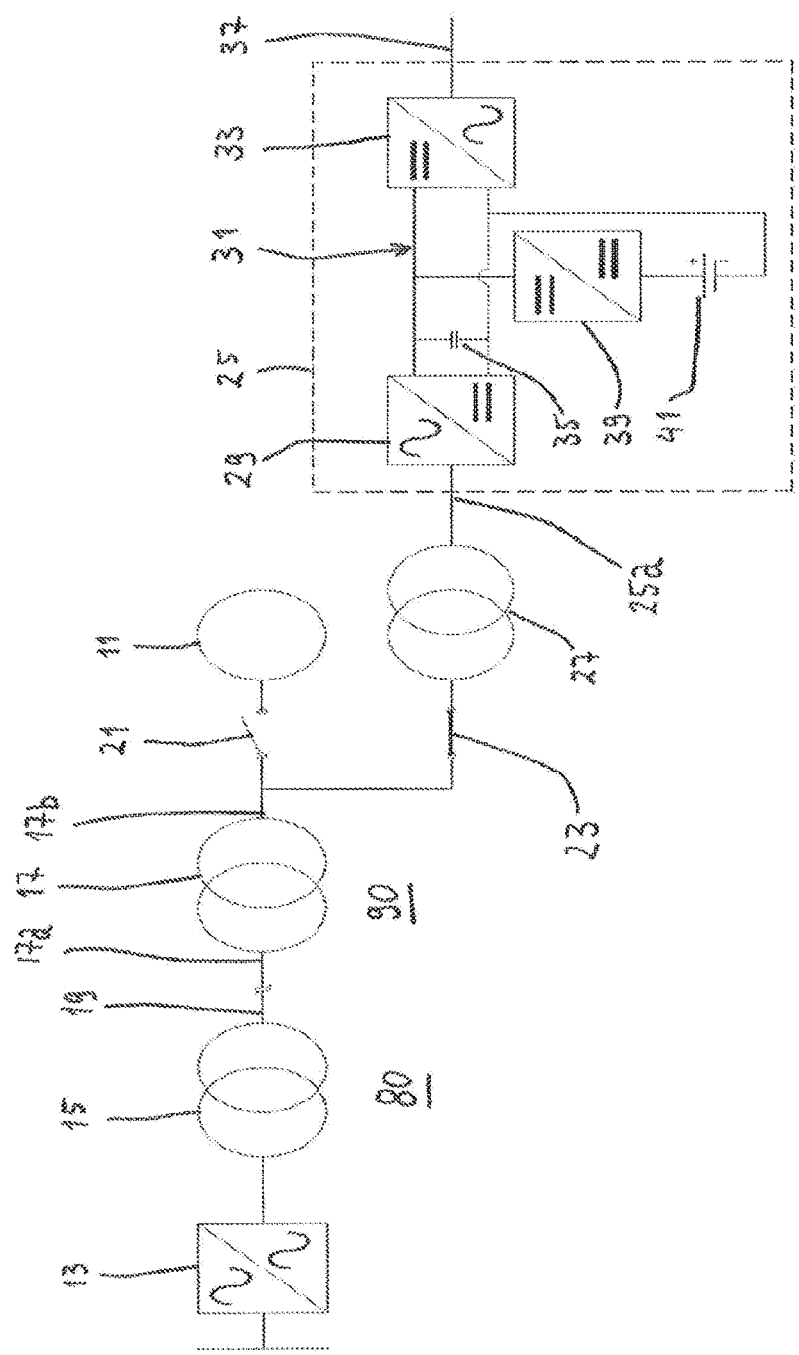
FIG. 6 is a schematic illustration of an embodiment of the present invention, in a situation before accelerating a subsea pump motor.
Figure 7:
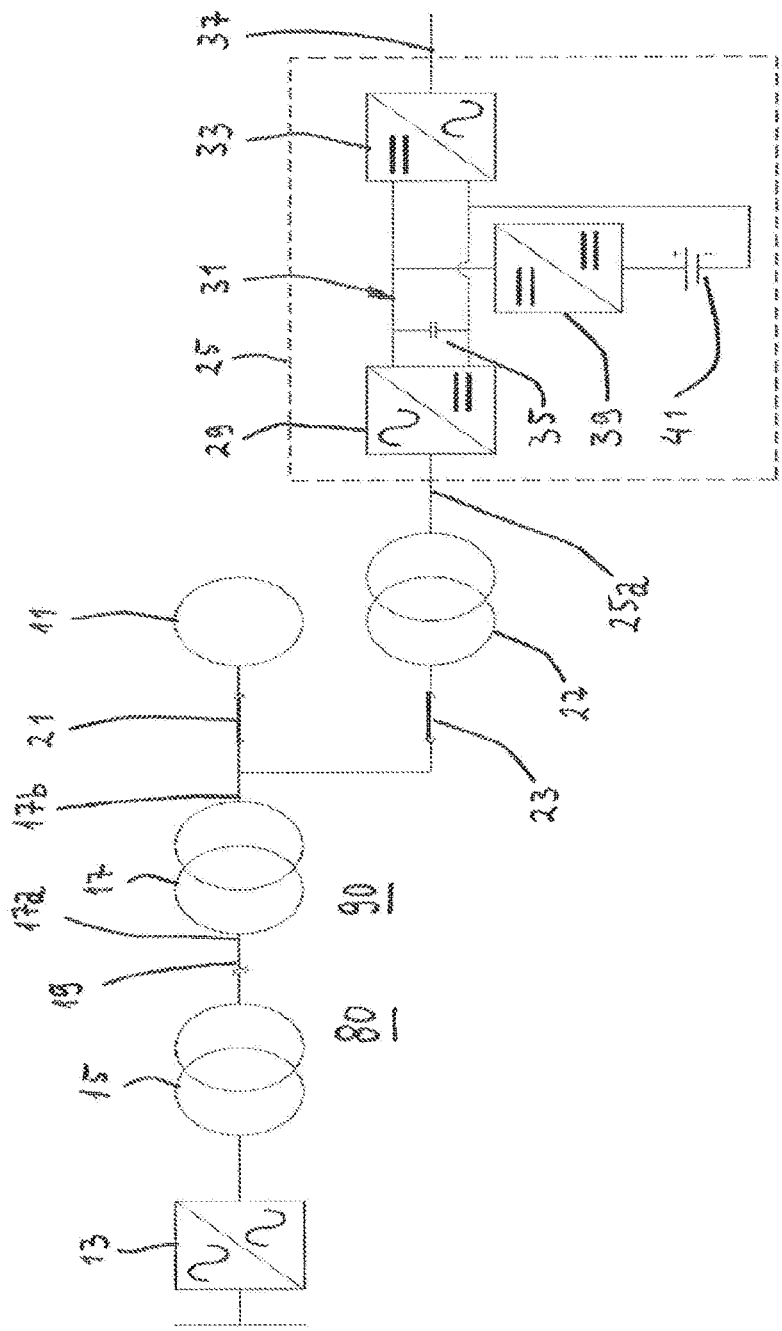
FIG. 7 is a schematic illustration similar to FIG. 5, in a situation where the pump motor is in an acceleration phase.

FIG. 6 and FIG. 7 illustrate the same embodiment as shown in FIG. 3. FIG. 6 illustrates a situation where the pump motor 11 as well as the subsea UPS 25 has not been used for some time. Hence, the battery 41 in the subsea UPS 25 may hold an insufficient amount of power to control the pump motor 11 and associated control equipment. Thus, before accelerating the pump motor 11, the battery 41 needs to be charged.

If there is insufficient power in the battery 41 to close the UPS switch 23, the operator may have to charge the battery 41 by other means. For instance, he can connect a battery charging umbilical to the battery 41 with a wet-mate connection. Or, he can use a remotely operated vehicle (ROV) to connect to the UPS 25 and the battery 41, for charging the battery to the umbilical 19, by closing the UPS switch 23.

If there is, on the other hand, sufficient power in the battery 41 to close the UPS switch 23, the operator closes the UPS switch 23 and then starts the topside VSD 13. The battery 41 is then charged until the subsea UPS 25 is ready for operation.

When the battery 41 has been charged, the operator stops the topside VSD 13 and closes the motor switch 21, as illustrated in FIG. 7. Then, by starting the topside VSD 13 the operator accelerates the pump motor 11 to the desired operational speed. In this situation, both the subsea UPS 25 and the pump motor 11 are provided with power through the umbilical 19.

In the prior art it is common to supply a UPS with electric power having constant frequency. With the subsea power supply assembly according to the present invention, the subsea UPS 25 needs however to tolerate varying frequency as well as varying input voltage. The frequency delivered to the pump motor 11 from the topside VSD 13 is the same frequency that is delivered to the subsea UPS 25. Hence, for a subsea UPS 25 used with the solutions described herein, the capacitance of the capacitor arrangement 35 will in most cases need to be increased in order to tolerate the low frequencies which may be fed to the pump motor 11.

To avoid an excessively large capacitance of the capacitance arrangement 35, one could open the UPS switch 23 while the pump motor 11 is running on low speed/low frequency. The subsea UPS 25 would then operate with battery power during such an acceleration phase. Once a sufficiently high frequency (and hence pump speed) is obtained, the UPS switch 23 could be closed again, so that the UPS receives power from the umbilical, and thus can supply full control power whilst charging the batteries.

Figure 8:
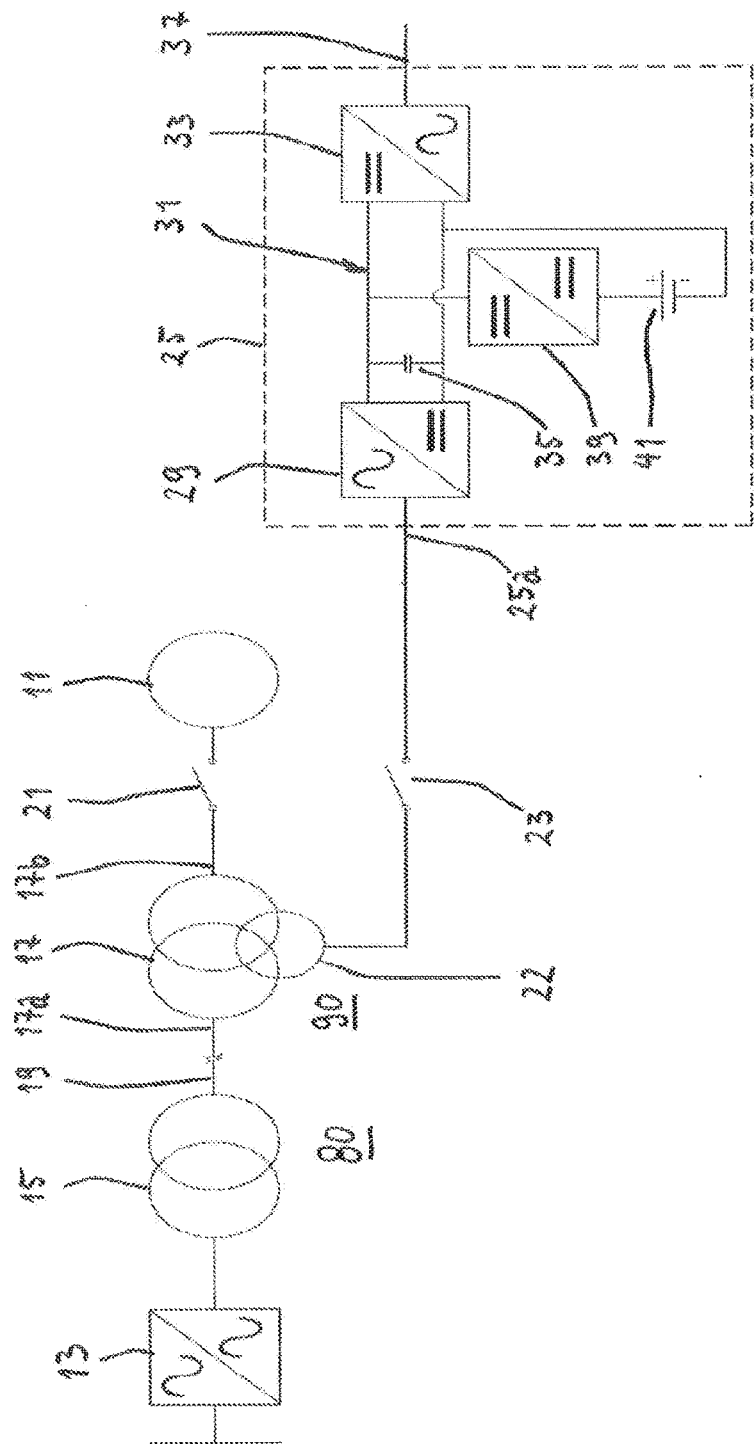
FIG. 8 is a schematic illustration of another embodiment according to the invention.

FIG. 8 shows an alternative embodiment of a subsea power supply assembly according to the invention. In this embodiment, the voltage is not reduced by means of the auxiliary step-down transformer (UPS step-down transformer) 27 shown in FIG. 3. Instead, the first step-down transformer 17 comprises an auxiliary winding, in the form of a third winding 22, which delivers electric power with reduced voltage to the subsea UPS 25.

Figure 9:
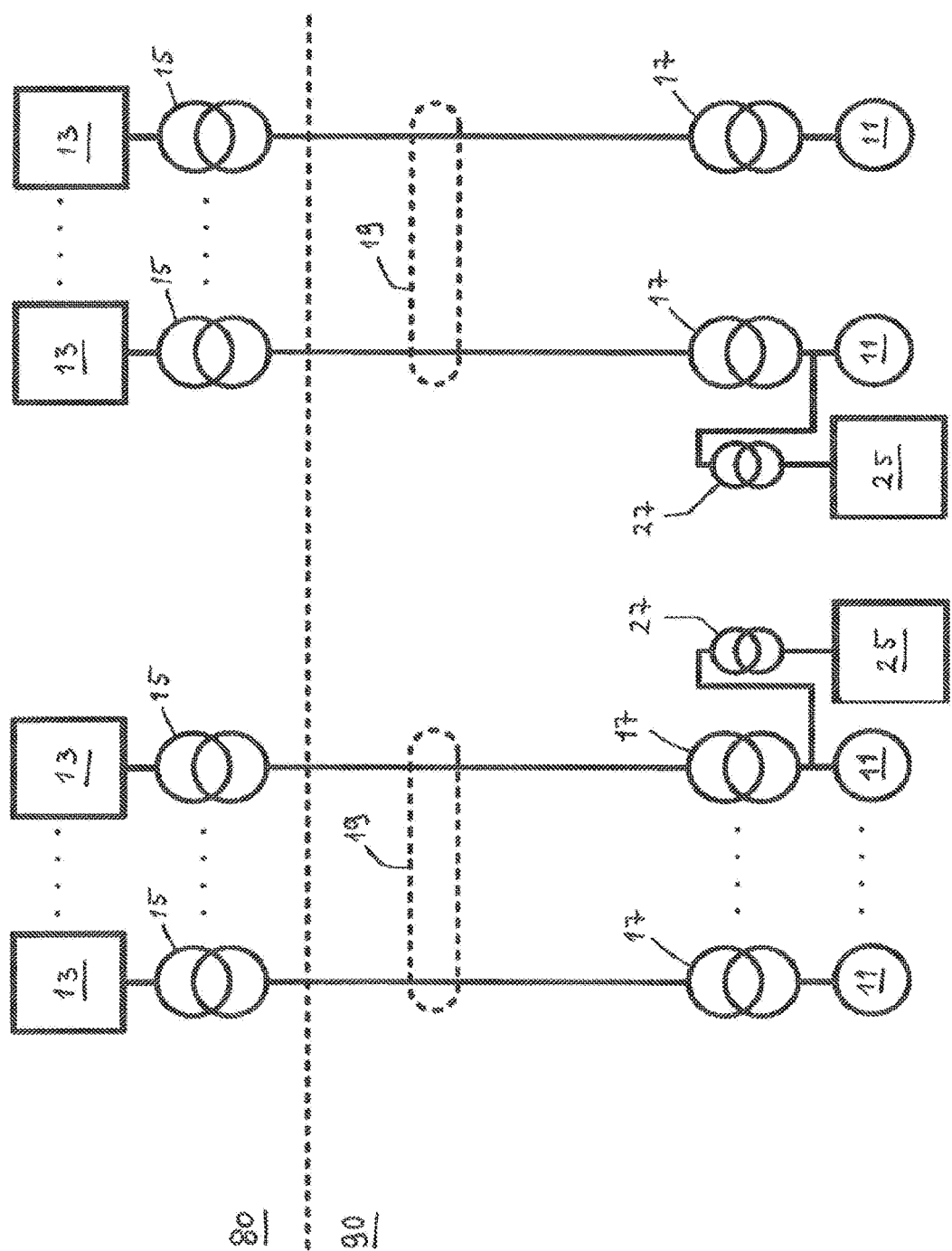
FIG. 9 is a schematic illustration of the same type as the illustration of FIG. 1, however depicting a possible embodiment of the present invention.

FIG. 9 schematically depicts an embodiment according to the invention. As with the prior art example shown in FIG. 1, one umbilical 19 delivers power to two large consumers in the form of electric motors 11. In contrast to the prior art example of FIG. 1 is however that the subsea UPS 25 is provided with power through the same umbilical 19 which delivers power to the motors 11. Thus, in the embodiment according to the invention, the umbilical 120 of the prior art example of FIG. 1, which provides power to subsea control power loads (112 in FIG. 1), is superfluous.

As will be appreciated by the person skilled in the art, within the scope of the invention is also an umbilical 19 providing power to only one motor 11, thus having only one set of conductors (typically 3-phase), that also provides power to a subsea UPS 25. Such an embodiment is shown, inter alia, in FIG. 3.

Reverting to the embodiment of FIG. 9, two umbilicals 19 provide power to four motors 11. Moreover, each umbilical provides power to a respective subsea UPS 25. For redundancy, each of the two subsea UPS's 25 can be adapted to provide uninterrupted power to control electronics to all four motors 11 as well as associated equipment.

Figure 10:
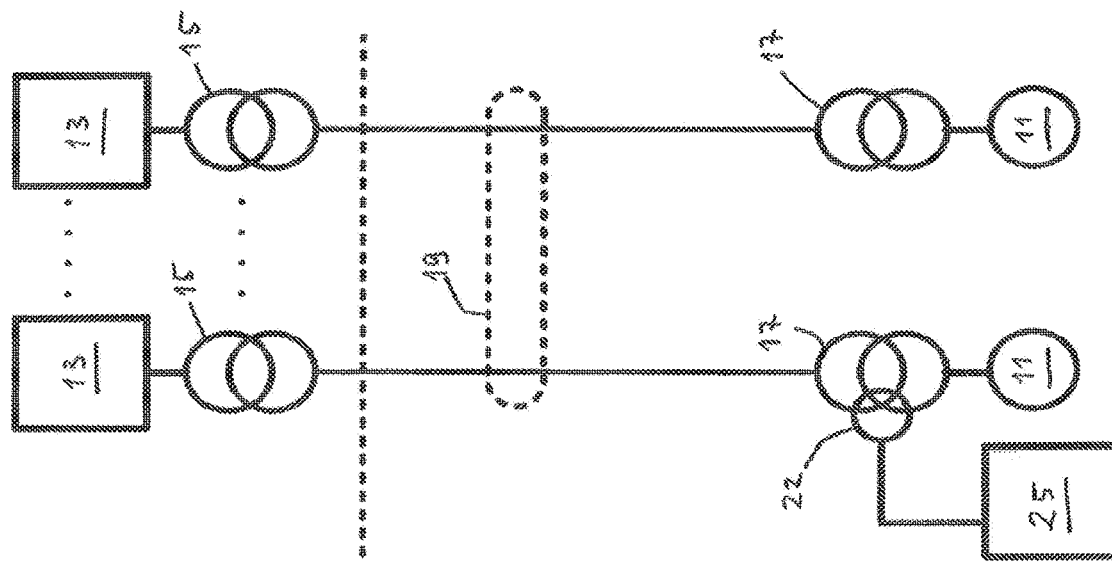
FIG. 10 is a schematic illustration similar to FIG. 9, depicting yet another embodiment.

FIG. 10 illustrates an embodiment similar to FIG. 9, however without the auxiliary step-down transformer 27. Instead, the first step-down transformer 17 is equipped with a third winding 22, such as illustrated in FIG. 8.

Figure 11:
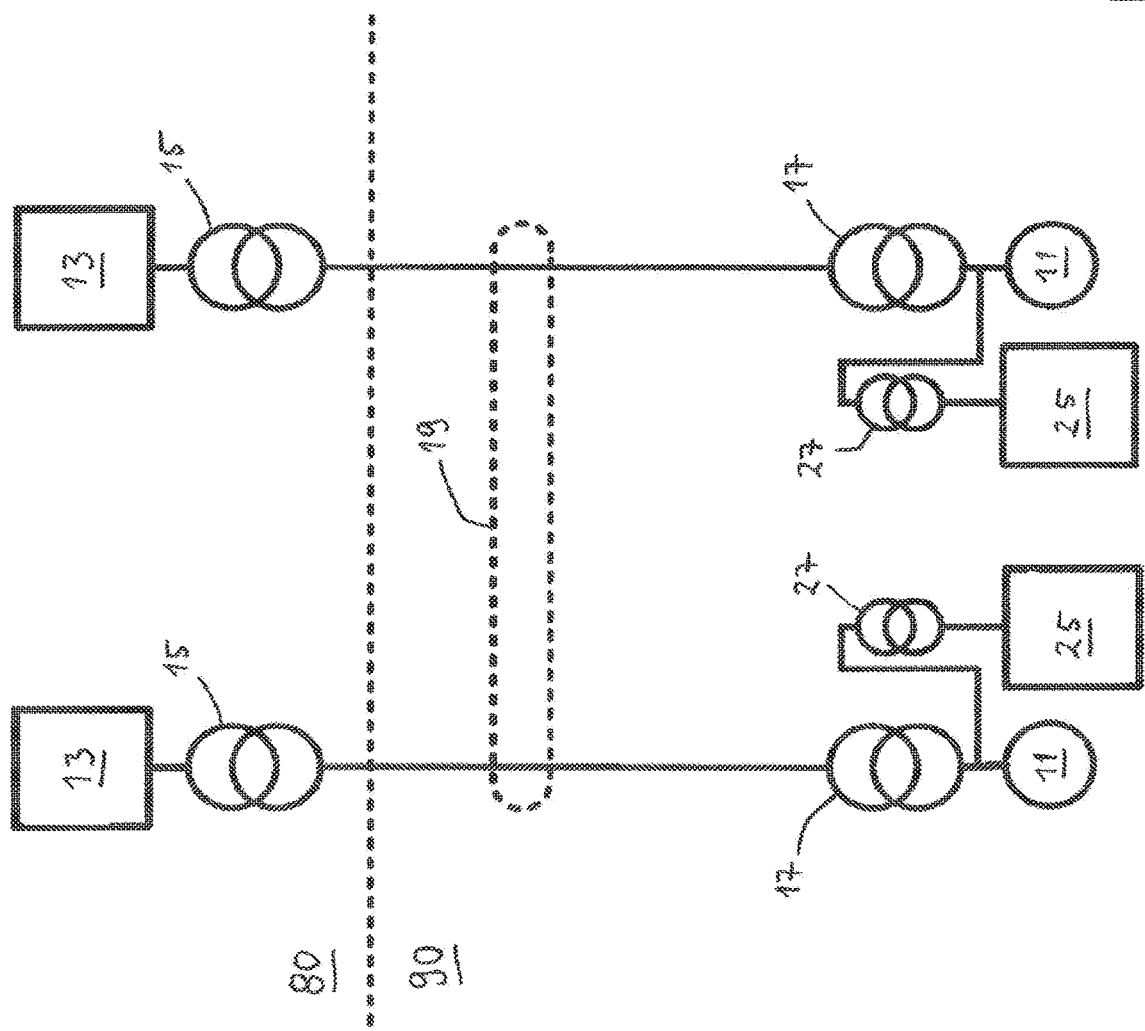
FIG. 11 is a schematic illustration similar to FIG. 9, depicting yet another embodiment.

FIG. 11 shows an embodiment with only one umbilical 19 which is common for two electric motors 11 and two subsea UPS's 25.

One can also imagine an embodiment according the invention similar to the embodiment shown in FIG. 11, however including only one motor 11 and one UPS 25. Such an embodiment would correspond to the right or the left half portion of FIG. 11 (divided along a vertical centerline in FIG. 11). Alternatively, an embodiment could include the components of such a half of FIG. 11, however having two UPS's 25 for redundancy.

Figure 12:
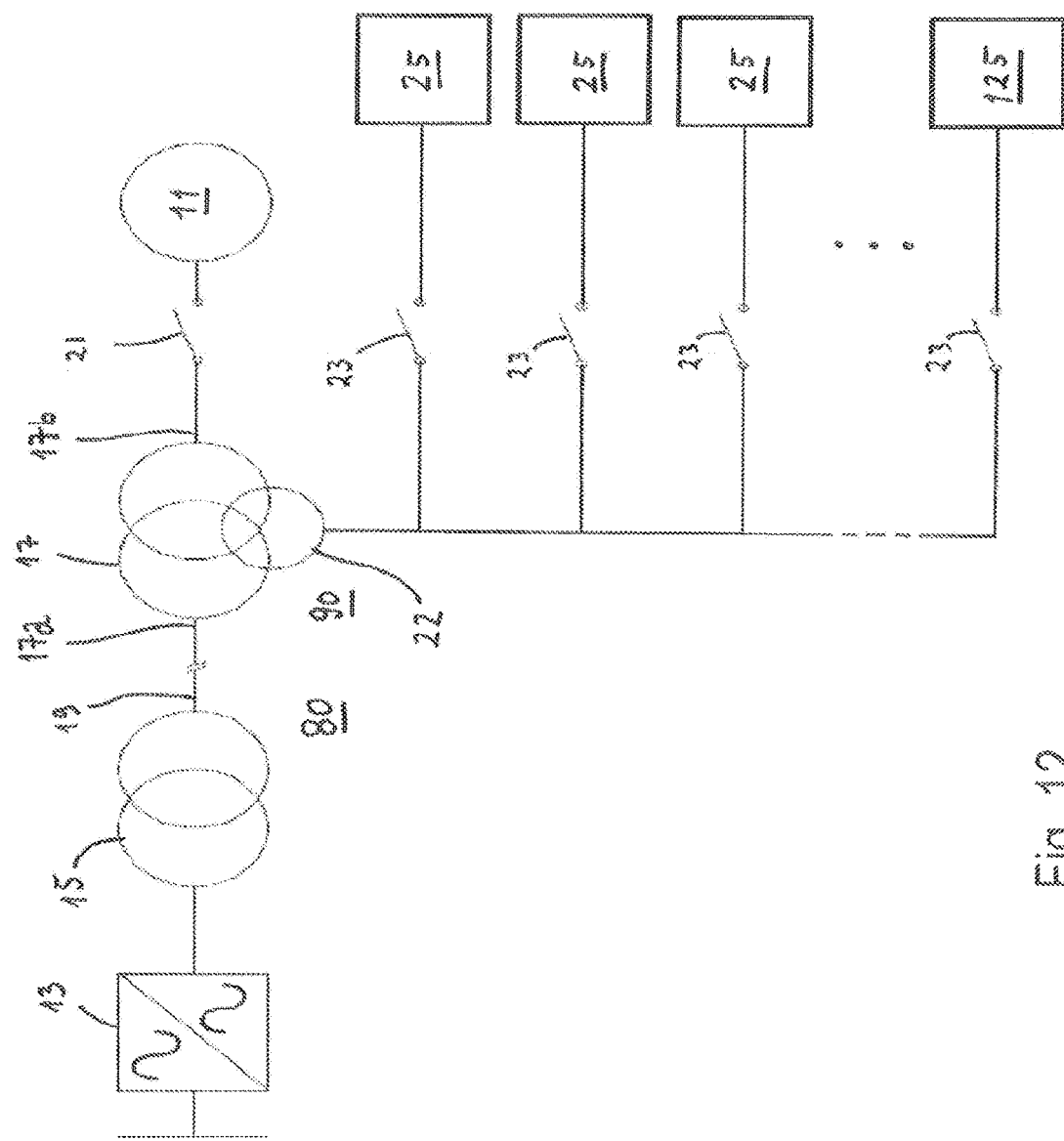
FIG. 12 is a schematic illustration of an embodiment similar to the embodiment shown in FIG. 8, however with a plurality of uninterruptable and other types of power supplies.

FIG. 12 is a schematic illustration of an embodiment similar to the embodiment shown in FIG. 8, however with a plurality of uninterruptable and other types of power supplies designed for variable frequency and variable voltage input. In this embodiment, three UPS units 25 are connected to the third winding 22 of the first step-down transformer 17. It may also be more than three, for instance five or ten UPS units 25. In addition, this embodiment involves also another type of power supply, such as a local power supply 125 without battery. The local power supply 125 may for instance provide power to electric actuators, subsea control modules, and other control power consumers. Common for the UPS units 25 and the additional local power supply 125, is that they all receive electric power having the same variable frequency and variable voltage as is fed to the electric motor 11.

Figure 13:
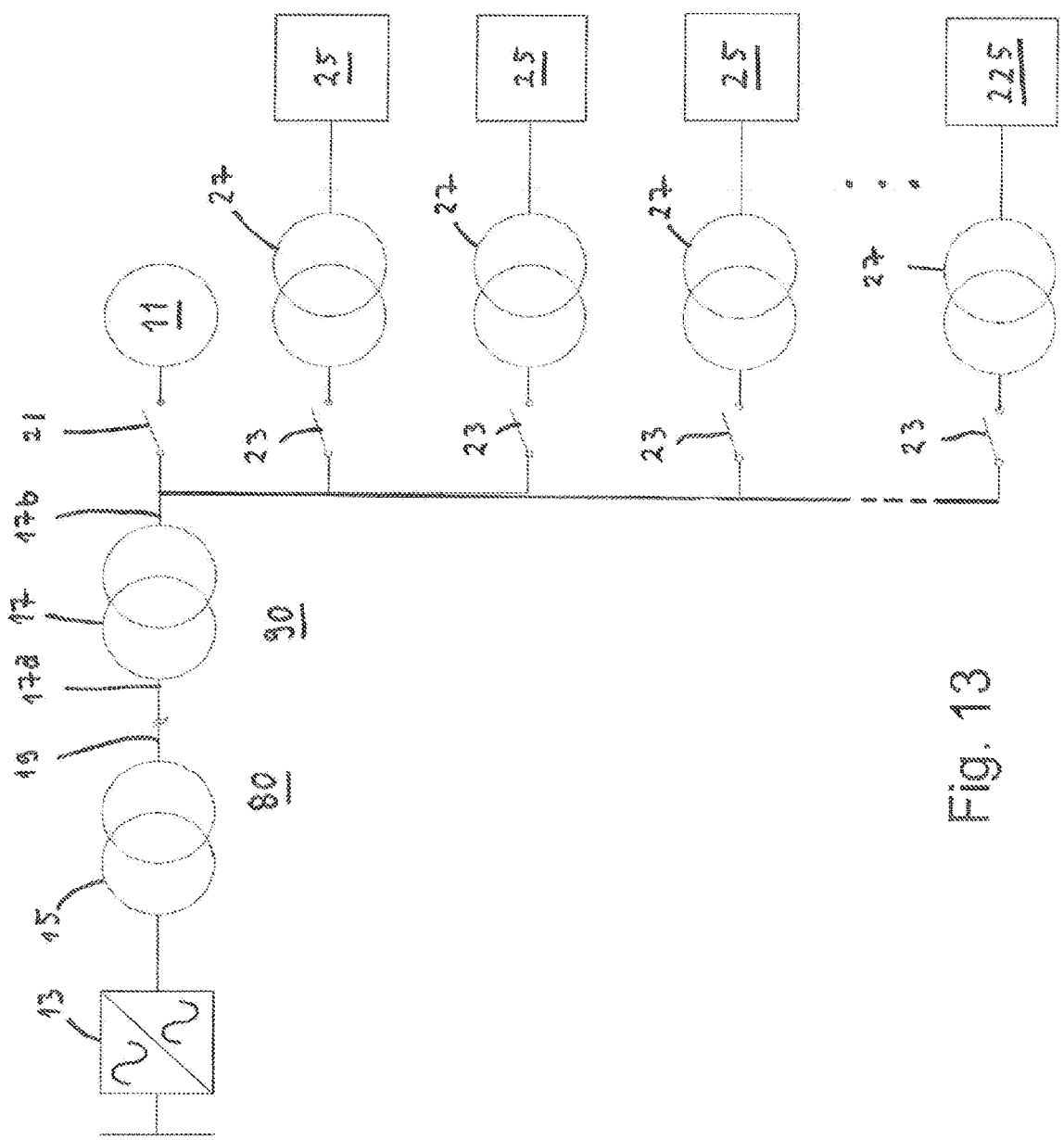
FIG. 13 is a schematic illustration of an embodiment similar to the embodiment shown in FIG. 5, however with a plurality of uninterruptable power supplies and other power supplies.

FIG. 13 depicts an embodiment which is similar to the one shown in FIG. 5. However, in this embodiment a plurality of uninterruptable power supply units and other power supplies are arranged, such as in the embodiment shown in FIG. 12.

The UPS units 25 and a smaller UPS 225 are connected to the step-down transformer via auxiliary step-down transformers 27. As with the embodiments discussed above, all the UPS units 25 and the smaller UPS 225 receive electric power having the same frequency as is fed to the electric motor 11.

In the embodiments shown in FIG. 12 and FIG. 3, an appropriate number of UPS units 25, local power supplies 125, and smaller UPS units 225 may be connected to the first step-down transformer 17.

The invention claimed is:

1. A subsea power supply assembly supplying electric power to an electric motor at a second location from a first location, the subsea power supply assembly comprising:
at the first location, which is an onshore location:
a variable speed drive having a variable speed drive output; and
a step-up transformer connected to the variable speed drive output;
at the second location, which is a subsea location:
a first step-down transformer having an input and an output; and
an uninterruptable power supply having a power receiving input;
wherein a step-out cable is adapted to supply electric power from the step-up transformer to the electric motor;
wherein the step-out cable is connected to the first step-down transformer; and
wherein the speed of the electric motor is proportional to the output frequency of the variable speed drive; and
wherein the power receiving input of the uninterruptable power supply connects to the output of the first step-down transformer, thereby receiving electrical power with frequency equal to the output frequency of the variable speed drive.

2. The subsea power supply assembly according to claim 1, wherein the uninterruptable power supply is adapted to receive said electrical power from the variable speed drive with a frequency between 2.5 to 110 percent of the rated maximum frequency or speed, respectively, of the electrical motor.

3. The subsea power supply assembly according to claim 1, wherein the uninterruptable power supply is adapted to receive said electrical power from the variable speed drive with a frequency between 5 to 105 percent of the rated maximum frequency or speed, respectively, of the electrical motor.

4. The subsea power supply assembly according to claim 1, wherein the speed of the electric motor is proportional to the output voltage of the variable speed drive, and that the electric power received by the power receiving input of the uninterruptable power supply has a voltage that is proportional to the frequency and speed of the electric motor.

5. The subsea power supply assembly according to claim 1, wherein the motor is connected to the output of the first step-down transformer.

6. The subsea power supply assembly according to claim 5, wherein an auxiliary step-down transformer is connected between the output of the first step-down transformer and the uninterruptable power supply.

7. The subsea power supply assembly according to claim 1, wherein the output of the first step-down transformer that connects to the uninterruptable power supply is constituted by an auxiliary winding of the first step-down transformer.

8. The subsea power supply assembly according to claim 1, wherein the uninterruptable power supply and the electric motor are functionally connected to the same at least two conductors in the step-out cable.

9. The subsea power supply assembly according to claim 1, wherein the step-out cable is an umbilical comprising a first set of three electric conductors in a first layer which is an inner layer, and a second set of three electric conductors in a second layer which is outside the first layer, wherein one of the first and second sets provides power to said electric motor and the other set provides power to an additional electric motor.

10. The subsea power supply assembly according to claim 1, wherein
the motor constitutes an electric load of above 100 kW; and
the variable speed drive at the first location is arranged more than 5 km apart from the motor.

11. A method of starting and running an electric motor which is mechanically connected to drive a pump or compressor at a second location which is a subsea location, wherein a first end of a step-out cable receives electric power from a variable speed drive at a first location, which is an onshore location, via a step-up transformer, and wherein the electric motor is connected to an opposite second end of the step-out cable, and wherein an uninterruptable power supply having a battery and a first step-down transformer are arranged at the second location, wherein the uninterruptable power supply is adapted to be connected to an output of the first step-down transformer via an uninterruptable power supply switch, the method comprising:
a) providing electric power from the output of the variable speed drive to the uninterruptable power supply by closing the uninterruptable power supply switch, and thereby charging the battery; and
c) after step a), providing electric power from the same variable speed drive to the electric motor by closing a motor switch, and simultaneously providing electric power to the uninterruptable power supply from the variable speed drive.

12. The method according to claim 11, wherein between step a) and step c), the method comprises the following step:
b) reducing the output of the variable speed drive; and
wherein step c) further comprises increasing the output of the variable speed drive, as the motor switch has been closed.

13. The method according to claim 11, wherein step a) further comprises reducing the voltage delivered from the first step-down transformer to the uninterruptable power supply via an uninterruptable power supply step-down transformer arranged between the first step-down transformer and the uninterruptable power supply.

14. The method according to claim 11, wherein step a) further comprises reducing the voltage delivered from the first step-down transformer to the uninterruptable power supply via delivering electric power through an auxiliary winding of the first step-down transformer.

15. The method according to claim 12, wherein:
   step b) further comprises opening the uninterruptable power supply switch; and
   step c) further comprises closing the uninterruptable power supply switch when the electric motor has reached a predetermined speed.

16. A method of running and controlling the speed of an electric motor arranged in a second location and providing electric power to an uninterruptable power supply arranged in the second location, which is a subsea location, wherein a variable speed drive is arranged at a first location, which is an onshore location, and is functionally connected to the electric motor, wherein the speed of the electric motor is controlled by controlling the output frequency of the variable speed drive, and wherein a step-out cable transmits power from the variable speed drive to the electric motor, thus extending between the first location and the second location, wherein the method comprises:
   a) transmitting electric power to the uninterruptable power supply through at least two conductors in the step-out cable which are the same conductors that transmit power to the electric motor.

* * * * *